(12) United States Patent
Lee

(10) Patent No.: US 7,389,753 B1
(45) Date of Patent: Jun. 24, 2008

(54) SYSTEM AND PROCESS FOR IMPROVING ENGINE PERFORMANCE

(76) Inventor: Dennis Lee, 3002 Route 23 North, Newfoundland, NJ (US) 07435

( * ) Notice: Subject to any disclaimer, the term of this patent is extended or adjusted under 35 U.S.C. 154(b) by 0 days.

(21) Appl. No.: 11/898,671

(22) Filed: Sep. 14, 2007

(51) Int. Cl.
*C10L 1/00* (2006.01)
(52) U.S. Cl. .......................................... 123/3; 204/173
(58) Field of Classification Search ................. 123/3; 204/166, 173, 242
See application file for complete search history.

(56) References Cited

U.S. PATENT DOCUMENTS

| | | | |
|---|---|---|---|
| 3,780,805 A * | 12/1973 | Green .................... 166/266 |
| 3,911,986 A * | 10/1975 | Charboneau et al. .. 123/142.5 R |
| 4,014,777 A | 3/1977 | Brown |
| 4,015,567 A | 4/1977 | Zabenskie |
| 4,074,670 A | 2/1978 | Roberts et al. |
| 4,081,656 A | 3/1978 | Brown |
| 4,158,346 A | 6/1979 | Roberts et al. |
| 4,527,533 A | 7/1985 | Laramee |
| 4,841,943 A | 6/1989 | Favreau et al. |
| 4,846,137 A | 7/1989 | Ray |
| 4,984,555 A | 1/1991 | Huang |
| 5,118,451 A | 6/1992 | Lambert, Sr. et al. |
| 5,923,944 A * | 7/1999 | Coffinberry et al. ......... 428/551 |
| 6,123,742 A | 9/2000 | Smith |
| 6,311,648 B1 | 11/2001 | Larocque |
| 7,021,249 B1 | 4/2006 | Christison |
| 7,143,722 B2 | 12/2006 | Ross |
| 2001/0003276 A1 | 6/2001 | DeSouza et al. |
| 2002/0170818 A1 * | 11/2002 | Miranda ..................... 204/173 |

* cited by examiner

*Primary Examiner*—Hieu T Vo
(74) *Attorney, Agent, or Firm*—Thomas J. Germinario

(57) ABSTRACT

An integrated system and process for improving internal combustion engine performance consists of four components: (1) an acetone-based fuel additive phase, (2) a fuel pre-heating and polarization phase, (3) an ionized hydrogen-oxygen plasma injection phase, and (4) a microprocessor-ECM interface phase to optimize the combined performance of the other three components.

8 Claims, 3 Drawing Sheets

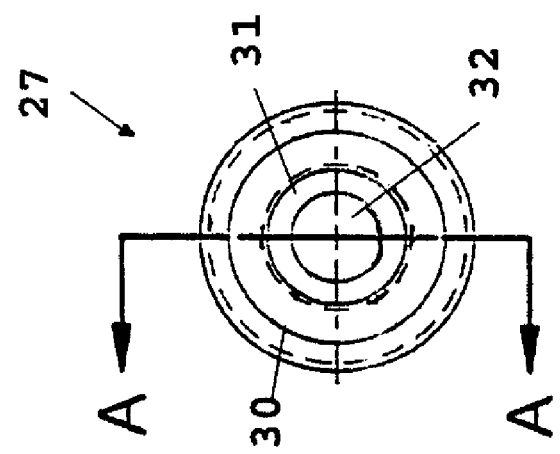
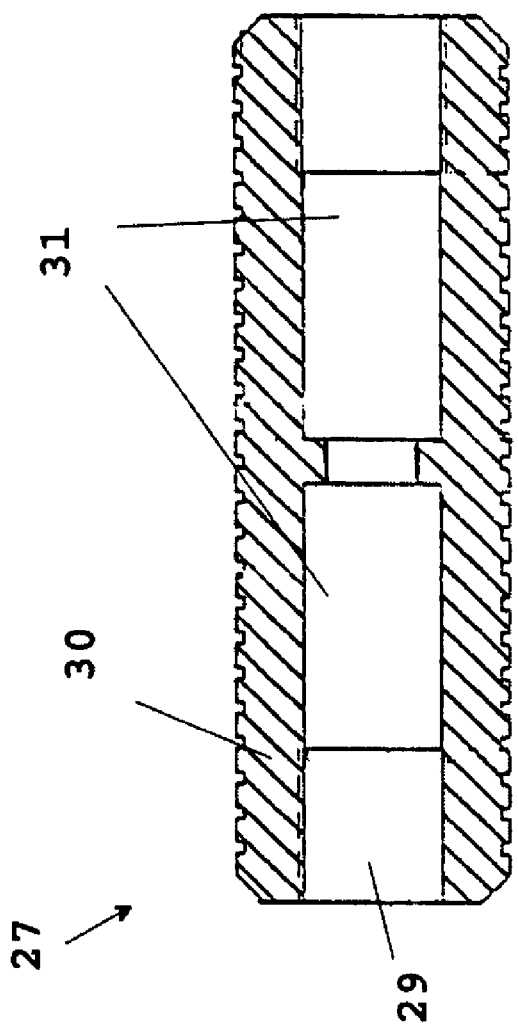

SYSTEM AND PROCESS FOR IMPROVING ENGINE PERFORMANCE

BACKGROUND OF THE INVENTION

This invention relates to an integrated system and process for improving the performance of internal combustion engines. Combustion efficiency is increased and exhaust emissions are reduced by the combined effects of: (1) introducing an acetone-based fuel additive in the fuel tank, (2) pre-heating and polarizing the fuel, and (3) mixing a plasma of ionized hydrogen and oxygen with the intake air. This integrated system and process produces synergistic fuel additives with superior combustion characteristics.

With respect to the first component of the present invention, the use of acetone-based fuel additives to improve fuel efficiency is known in the prior art. One example of such a fuel additive is disclosed in Smith, U.S. Pat. No. 6,123,742. Acetone acts as a surfactant with respect to gasoline, reducing the surface tension of the liquid fuel so that it forms finer droplets that vaporize more readily. In the Smith patent disclosure, as in the present invention, acetone is mixed with xylene, the latter being an aromatic hydrocarbon which boosts the fuel's octane rating.

The acetone-based fuel additive component of the present invention differs from those disclosed in the prior art because it is formulated specifically to work in concert with the other two components of this invention. The composition of the additive and the ratio of its fuel mixture are optimized to complement the other fuel enhancement features of this invention.

With respect to the second component of this invention, a number of fuel preheaters are disclosed in the prior art, including Zabenskie, U.S. Pat. No. 4,015,567; Laramee, U.S. Pat. No. 4,527,533; Favreau et al., U.S. Pat. No. 4,841,943; Ray, U.S. Pat. No. 4,846,137; Huang, U.S. Pat. No. 4,984,555; and Lambert, Sr., et al, U.S. Pat. No. 5,118,451. These preheaters operate on the basis of a heat-exchange process between the fuel and hot-water side of the engine cooling system, as does the present invention. The prior art fuel preheaters in some instances produce a super-heated fuel (e.g., Favreau, et al.) and in other instances a vaporized fuel (e.g., Lambert, Sr., et al.). But none of the prior art devices produce a polarized preheated fuel, as does the present invention. The effect of the second component of the present invention is not only to preheat the fuel, but also to polarize the fuel's covalent hydrocarbon bonds, thereby rendering the hydrocarbon molecules more rapidly and completely combustible.

With respect to the third component of this invention, the prior art encompasses several devices for generating gaseous hydrogen-oxygen mixtures to be mixed with fuel prior to combustion. Examples are Ross, U.S. Pat. No. 7,143,722, Larocque, U.S. Pat. No. 6,311,648 and DeSouza, Pub. No. U.S. 2001/0003276. These devices all use an electrolysis cell to electrolyze water into hydrogen and oxygen.

In the electrolysis process, positively-charged hydrogen ions are generated at the cathode, while negatively charged oxygen ions are generated at the anode. In the prior art electrolysis devices, however, no effort is made to retain the ionized state of the generated gases, which simply revert to molecular hydrogen $H_2$ and oxygen $O_2$. Consequently, these devices fail to take advantage of the superior combustion characteristics of an ionized hydrogen-oxygen mixture.

In the present invention, on the other hand, the ionized $H^+/O^-$ plasma is not mixed with the fuel, but instead it is drawn from an electrolysis cell directly into the engine's air intake manifold by a Venturi injector. Consequently, the gaseous hydrogen and oxygen remain in an ionized state when they mix with the atomized fuel at the fuel injection ports. Since the fuel itself has already been polarized by the second component of this invention, moreover, the resulting air-fuel mixture is a highly combustible blend of ionized hydrogen-oxygen plasma and enhanced, pre-heated polarized fuel.

Consequently, the present invention presents a unique combination of synergistic fuel additives, fuel pre-heating, fuel polarization, and ionized hydrogen-oxygen injection. The overall result is an ionized gaseous plasma containing enhanced fuel which, when introduced into the engine's cylinders, combusts within optimum efficiency, both maximizing energy recovery and minimizing polluting residuals.

SUMMARY OF THE INVENTION

It is an object of the present invention to maximize the fuel energy efficiency of internal combustion engines while simultaneously minimizing combustion residuals that cause harmful emissions.

It is another object of the present invention to increase internal combustion engine efficiency by recovering waste heat from the engine cooling system and using that heat to pre-heat the fuel so as to make it more readily combustible.

It is yet another object of the present invention to further improve the combustibility of the fuel by passing it through an annular array of magnets during the preheating process in order to polarize the fuel, thereby weakening its covalent bonds and rendering the fuel more readily combustible.

It is a further object of the present invention to inject directly into the engine's intake manifold ionized hydrogen and oxygen gases generated by the electrolysis of water, and to have the ionized $H^+/O^-$ plasma mix with the atomized polarized fuel downstream of the fuel injectors to produce a highly combustible combination of hydrogen-oxygen plasma and enhanced, pre-heated polarized fuel.

It is yet a further object of the present invention to introduce an acetone-based additive to the fuel in a vehicle's fuel tank, with the additive being so formulated and so proportioned to the fuel as to render the fuel more tractable to the pre-heating, polarization and plasma injection processes.

These and other beneficial results are achieved through a three-stage fuel enhancement process, comprising:

1. An acetone-based fuel additive stage,
2. A fuel preheating and polarization stage, and
3. An ionized hydrogen-oxygen plasma injection stage.

The fuel additive stage is implemented by introducing an acetone-based fuel additive directly into a vehicle's tank. By reducing the surface tension of the liquid fuel, the acetone in the additive enables the fuel to atomize into finer droplets and to vaporize more readily. Inclusion of xylene in the additive works to weaken the covalent hydrocarbon bonds of the fuel. Thus the fuel is pre-conditioned and rendered more tractable to the subsequent preheating and polarization stage.

In the preferred embodiment of the present invention, the fuel additive comprises equal volumes of three constituents: acetone, xylene and a conditioning lubricant. The xylene boosts the fuel's octane rating and thus improves engine performance. The conditioning lubricant, which serves to protect the engine and further condition the fuel, comprises, by volume: one part Accelerator™ octane booster; one part Energy Release™ cylinder coating; three parts GP-7 two-cycle auto racing oil, and three parts Lucas™ auto racing oil. The additive is mixed with fuel in the vehicle's fuel tank at a ratio of 3 fluid ounces of additive to 10 gallons of fuel.

The fuel preheating and ionization stage utilizes a heat-exchanger manifold which is installed in the hot-water side of the engine cooling system, typically upstream of the radiator. The heat-exchanger manifold comprises an inner sleeve, through which the fuel flows, and an outer sleeve, through which or along which the hot engine coolant circulates, thereby transferring heat to the fuel. The inner sleeve comprises a series of interconnected annular or tubular magnets, such that the fuel flows through the apertures of the magnets and is polarized by the magnetic field. The heated and polarized fuel then flows from the heat-exchanger manifold into the fuel injectors, where it is atomized and injected into the airflow to the engine cylinders at the fuel injection ports.

The ionized hydrogen-oxygen fuel enhancement stage utilizes an electrolysis cell, preferably of the type disclosed in the patents of Yull Brown, U.S. Pat. Nos. 4,014,777 and 4,081,656, to generate a plasma consisting of two parts $H^+$ ions to one part $O^-$ ions. The hydrogen-oxygen plasma is drawn out of the electrolysis cell by a Venturi injector, which utilizes a partial vacuum created by the flow of intake air across a Venturi opening or tube. An microprocessor optimizer is used in conjunction with the vehicle's engine and emissions sensors to set the air-to-fuel ratio in order to adjust for the increased energy content of the enhanced fuel-plasma mixture.

As a result of the process and associated apparatus of this invention, the fuel injectors receive an additive-conditioned preheated polarized fuel with optimal atomization/vaporization characteristics, and inject it into an intake airflow containing ionized hydrogen and oxygen plasma. This highly combustible mixture is fed to the engine cylinders at the optimal air-to-fuel ratio set by the optimizer.

BRIEF DESCRIPTION OF THE DRAWINGS

FIGS. 3A and 3B are, respectively, lateral and transverse cross section views of the heat-exchanger manifold according to the preferred embodiment of the present invention.

DETAILED DESCRIPTION OF THE PREFERRED EMBODIMENT

Figure 1:
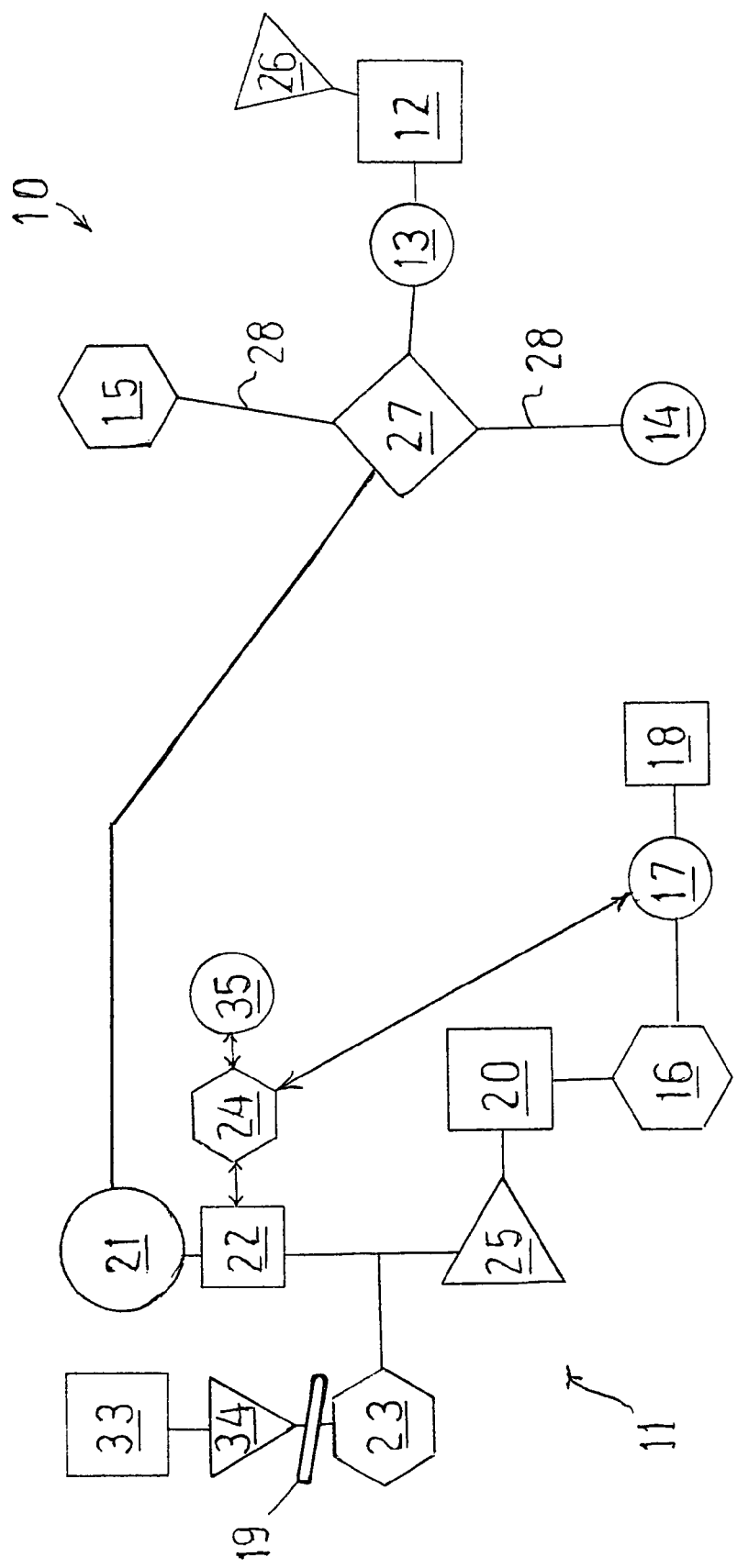
FIG. 1 is a flow chart illustrating the process of the preferred embodiment of the present invention.

Referring to FIG. 1, the preferred embodiment of the present invention 10 is designed to be implemented and installed in a motor vehicle having an internal combustion engine 11, a fuel tank 12, a fuel pump 13, a water pump 14, a radiator 15, an exhaust manifold 16, one or more engine/emissions sensors 17, and a catalytic converter 18. Comprising the engine 11 are a throttle plate 19, a plurality of cylinders 20, a plurality of fuel injectors 21, a plurality of injection ports 22, an intake manifold 23, and an engine control module (ECM) 24.

In the conventional functioning of the engine 11, fuel from the fuel tank 12 is pumped by the fuel pump 13 to the fuel injectors 21. The fuel injectors 21 atomize the fuel and periodically dispense it in discrete pulses through the injection ports 22 into an airflow that enters the engine through the intake manifold 23 under the regulation of the throttle plate 19. The resulting air-fuel mixture is then drawn into multiple intake valves 25, through which the air-fuel mixture passes into the cylinders 20 and is combusted. The air-to-fuel ratio of the mixture is regulated by the duration of the fuel injection pulses, which is in turn controlled by the ECM 24 based on monitoring of oxygen levels in the exhaust manifold 16 upstream of the catalytic converter 18 by the engine/emissions sensors 17.

An acetone-based fuel additive 26 is introduced directly into the fuel tank 12, preferably at a ratio of 3 fluid ounces of additive to 10 gallons of fuel. Preferably, the fuel additive 26 comprises equal volumes of acetone, xylene and a conditioning lubricant. By volume, the conditioning lubricant component consists of one part Accelerator™ octane booster, one part Energy Release™ cylinder coating, three parts GP-7 two-cycle racing oil, and three parts Lucas™ racing oil.

Figure 2:
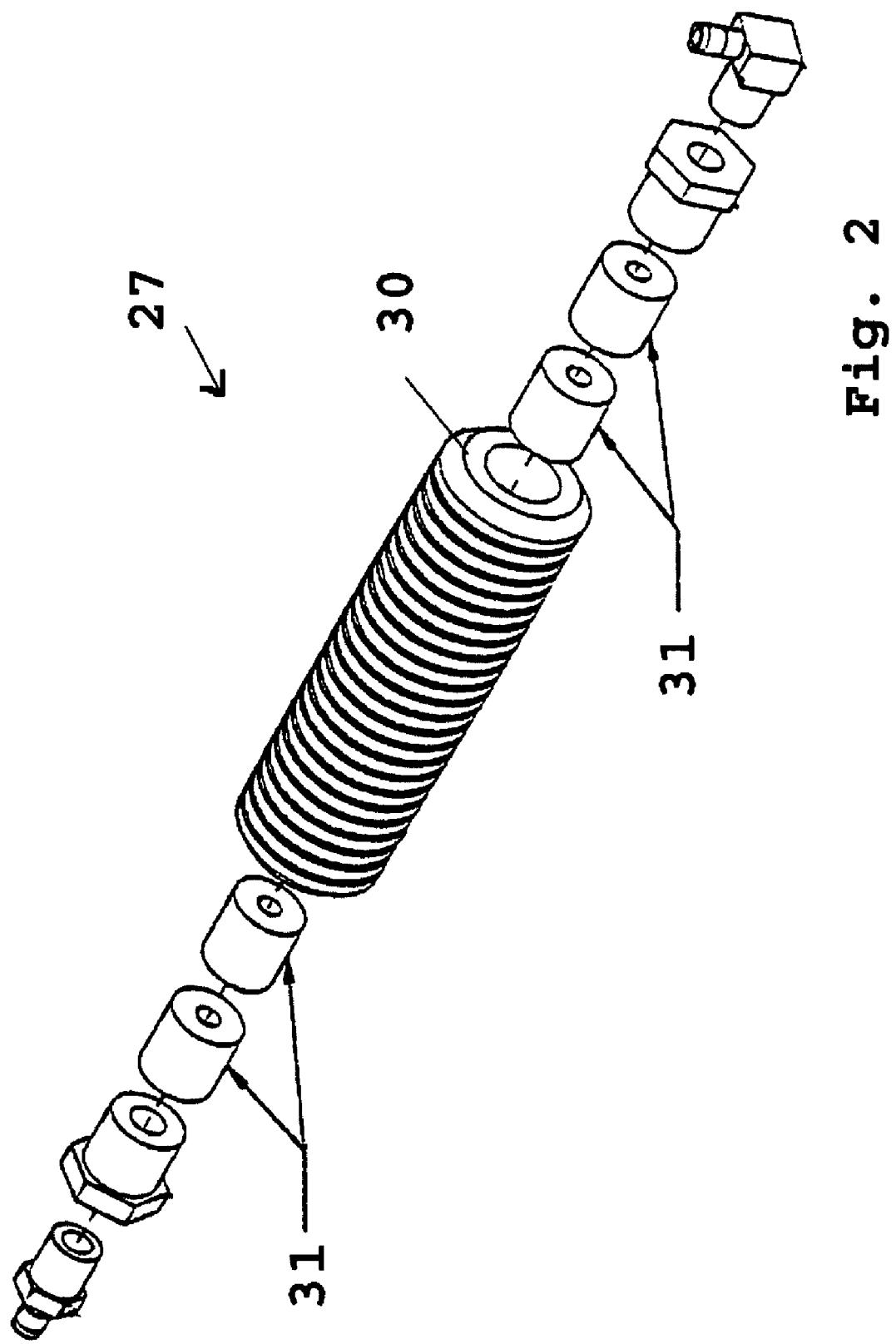
FIG. 2 is a perspective exploded view of the heat-exchanger manifold according to the preferred embodiment of the present invention.

From the fuel tank 12, the additive-conditioned fuel passes through a heat-exchanger manifold 27, which is installed on the hot-water side of the engine's cooling system, typically in or on a section of radiator hose 28 upstream of the radiator 15. The heat-exchanger manifold 27 can be installed alternately either within the upstream section of radiator hose 28 or on its outer surface. Referring to FIGS. 2, 3A and 3B, the heat-exchanger manifold 27 comprises an inner sleeve 29, through which the fuel flows, and an outer sleeve 30, through which or across which hot engine coolant circulates and thereby transfers heat to the fuel. In the alternative embodiment, in which the heat-exchanger manifold 27 is attached to the outer surface of the upstream section of radiator hose 28, heat is transferred from the hot engine coolant to the outer sleeve 30 through the radiator hose 28.

The inner sleeve 29 comprises a series of interconnected annular or tubular magnets 31, such that the fuel flows through the apertures 32 of the magnets 31 and is polarized by the magnetic field. The heated and polarized fuel then flows from the heat-exchanger manifold 27 into the fuel injectors 21, where it is atomized and injected into the gases drawn into the intake manifold 23.

The electrolysis cell 33 generates a plasma consisting of two parts $H^+$ ions to one part $O^-$ ions. The hydrogen-oxygen plasma is drawn out of the electrolysis cell by a Venturi injector 34, which utilizes a partial vacuum created by the flow of intake air across a Venturi opening or tube. A microprocessor optimizer 35 interfaces with the vehicle's engine/emissions sensors 17 and ECM 24 to control the pulse duration of the fuel injectors 21 so that the air-to-fuel ratio is adjusted for the increased energy content of the enhanced fuel-plasma mixture. This function of the optimizer will typically result in a leaner air-to-fuel ratio than would otherwise be imposed by the ECM 24 alone as dictated by its default settings.

As a result of the process and associated apparatus of this invention, the cylinders 20 receive the pre-heated, polarized, additive-conditioned fuel optimally atomized and mixed with ionized hydrogen-oxygen plasma, such that the combustion efficiency is maximized and residual pollutants are minimized.

While this invention has been described with reference to a specific embodiment, the description is not to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments that fall within the true scope of this invention.

What is claimed is:

1. A system for improving the performance of an internal combustion engine comprising:

(a) a motor vehicle comprising an internal combustion engine, a fuel tank, a fuel pump, a water pump, a radiator, an exhaust manifold, a catalytic converter, and one or more engine/emissions sensors, with the internal combustion engine comprising a throttle plate, a plurality of cylinders, a plurality of fuel injectors, a plurality of injector ports, an intake manifold, and an engine control module (ECM), such that the engine combusts a hydrocarbon fuel in the cylinders and is cooled by a liquid engine coolant that releases its heat to the atmosphere through the radiator, and such that an uncombusted residual of the fuel passes out of the vehicle through an exhaust manifold that contains the catalytic converter, and such that the fuel is pumped from the fuel tank by the fuel pump to the fuel injectors, in which the fuel is atomized and discretely pulsed in periodic intervals at a regulated pulse duration through the injector ports into an airflow drawn into the engine through the intake manifold under the regulation of the throttle plate, and such that the resulting mixture of air and fuel has an air-to-fuel ratio that is regulated by the pulse duration of the fuel injectors, which is in turn controlled by the ECM, based on ECM monitoring of a plurality of conditions of engine operation and emissions, and subject to a plurality of ECM default settings when conditions exceed an established range, and such that the air and fuel mixture is drawn into the cylinders and combusted;

(b) a fuel additive containing acetone, xylene and a conditioning lubricant, which fuel additive is introduced directly into the fuel tank and mixed with the fuel, thereby reducing the surface tension of the fuel and increasing its octane rating and producing an additive-enhanced fuel;

(c) a heat exchanger manifold that is located within or on an intake hose which hydraulically connects the water pump to the radiator, which heat exchange manifold comprises an outer sleeve, through which or across which the heated engine coolant is pumped by the water pump through the intake hose to the radiator, and an inner sleeve that is hydraulically connected to the fuel pump and the fuel injectors, through which inner sleeve the additive-enhanced fuel is pumped by the fuel pump from the fuel tank to the fuel injectors, and which inner sleeve further comprises a series of annular or tubular magnets with concentric apertures, such that the additive-enhanced fuel flows through the apertures of the magnets, and such that the additive-enhanced fuel is simultaneously heated by the engine coolant flowing through or across the outer sleeve and polarized by a magnetic field generated by the magnets, thereby producing an additive-enhanced, pre-heated and polarized fuel;

(d) an electrolysis cell, which electrically decomposes water to generate a gaseous plasma consisting of two parts by volume of positively-charged hydrogen ions and one part by volume of negatively-charged oxygen ions, such that the gaseous plasma is drawn into the airflow to the intake manifold through a Venturi injector, which utilizes a partial vacuum created by the flow of intake air across a Venturi opening or tube, and such that the gaseous plasma becomes part of the airflow into which the fuel injectors inject the additive-enhanced, pre-heated and polarized fuel, thereby producing an enhanced fuel-plasma mixture with a higher energy content as compared to conventional hydrocarbon fuel; and (e) an optimizer, which is a digital microprocessor that interfaces with the vehicle's engine/emissions sensors and ECM to control the pulse duration of the fuel injectors so that the air-to-fuel ratio is adjusted for the higher energy content of the enhanced fuel-plasma mixture and the ECM default settings are avoided.

2. The system for improving performance of an internal combustion engine according to claim 1, wherein the fuel additive is introduced into the fuel tank at a ratio of 3 ounces of fuel additive to 10 gallons of fuel.

3. The system for improving performance of an internal combustion engine according to either of claim 1 or 2, wherein the fuel additive comprises equal volumes of acetone, xylene and a conditioning lubricant.

4. The system for improving performance of an internal combustion engine according to claim 3, wherein the conditioning lubricant consists, by volume, of one part Accelerator™ octane booster, one part Energy Release™ cylinder coating, three parts GP-7™ two-cylinder racing oil, and three parts Lucas™ racing oil.

5. A process for improving the performance of an internal combustion engine comprising:
 (a) a first step of enhancing a hydrocarbon fuel with a fuel additive comprising of acetone, xylene and a conditioning lubricant, by pouring the fuel additive into a fuel tank thereby producing an additive-enhanced fuel;
 (b) a second step of pre-heating and polarizing the additive-enhanced fuel by pumping the additive-enhanced fuel from the fuel tank through a heat exchanger, and in the heat exchanger passing the additive-enhanced fuel in proximity to a flow of heated coolant from the engine, and also in the heat exchanger passing the additive-enhanced fuel through a magnetic field thereby producing an additive-enhanced pre-heated and polarized fuel;
 (c) a third step of generating a gaseous plasma of hydrogen and oxygen ions by the electrolysis of water in an electrolysis cell and pneumatically injecting the gaseous plasma into an airflow drawn into the engine through an intake manifold, thereby producing an air-plasma mixture; and
 (d) a fourth step of atomizing the additive-enhanced, pre-heated and polarized fuel and mixing it with the air-plasma mixture, thereby producing an enhanced fuel-plasma mixture having a higher energy content as compared with a conventional hydrocarbon fuel; and
 (e) a fifth step of interfacing a digital microprocessor optimizer with an engine control module (ECM) having a plurality of ECM default settings, and modifying the operation of the ECM so as to produce an optimal air-to-fuel ratio that takes into account the higher energy content of the enhanced fuel-plasma mixture while avoiding the ECM default settings, and thereby producing an optimized enhanced fuel-plasma mixture; and
 (f) a sixth step of drawing the optimized enhanced fuel-plasma mixture into a plurality of cylinders and therein combusting the optimized enhanced fuel-plasma mixture.

6. The process for improving performance of an internal combustion engine according to claim 5, wherein the first step further comprises pouring the fuel additive into the fuel tank at a ratio of 3 ounces of fuel additive to 10 gallons of fuel.

7. The process for improving performance of an internal combustion engine according to either of claim 5 or 6, wherein in the first step the fuel additive comprises equal volumes of acetone, xylene and a conditioning lubricant.

8. The process for improving performance of an internal combustion engine according to claim 7, wherein in the first step the conditioning lubricant consists, by volume, of one part Accelerator™ octane booster, one part Energy Release™ cylinder coating, three parts GP-7™ two-cylinder racing oil, and three parts Lucas™ racing oil.

* * * * *